Feb. 21, 1933. J. G. SMITHSON 1,898,403
CONTROL OF ELECTRIC MOTORS
Filed Aug. 19, 1931
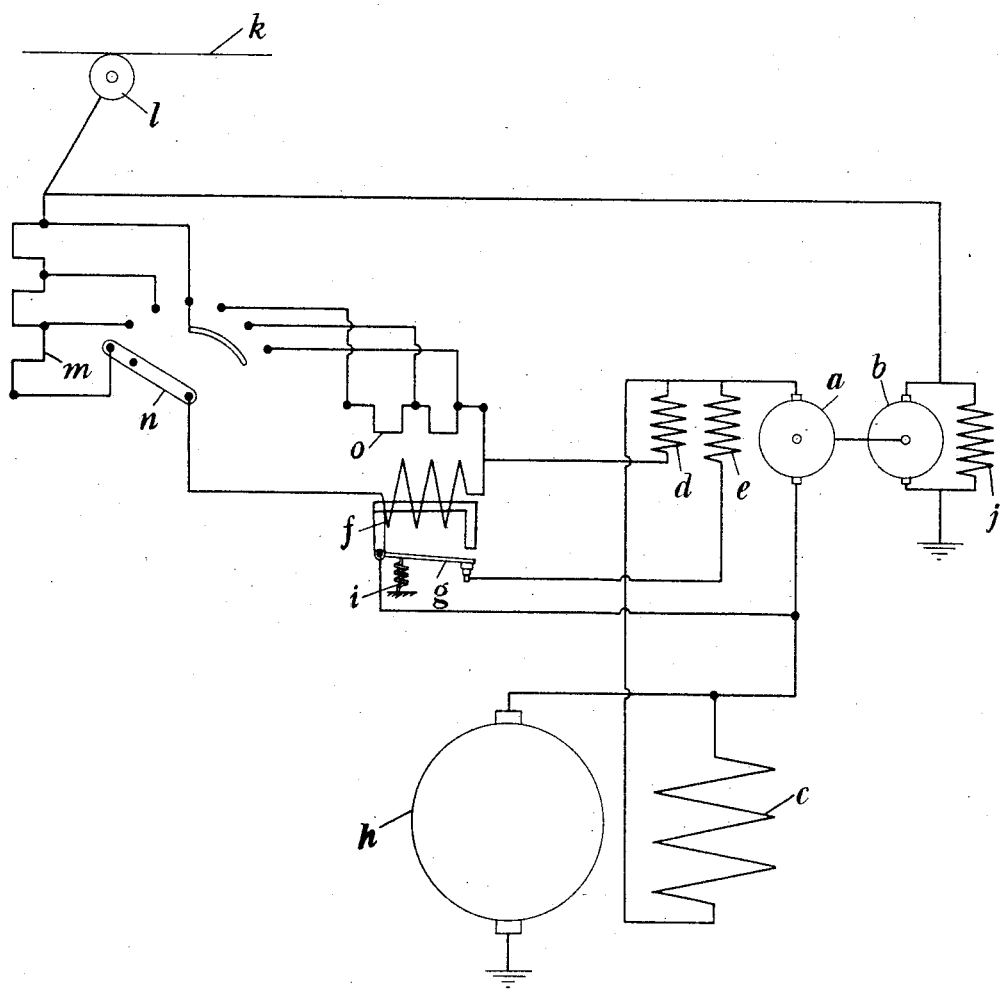
J. G. Smithson
INVENTOR
By: Marks & Clerk
Attys Patented Feb. 21, 1933

1,898,403

UNITED STATES PATENT OFFICE

JOHN GOAD SMITHSON, OF OAKDALE, ALVECHURCH, ENGLAND, ASSIGNOR OF ONE-HALF TO THE ELECTRO-MECHANICAL BRAKE COMPANY LIMITED, OF WEST BROMWICH, ENGLAND

CONTROL OF ELECTRIC MOTORS

Application filed August 19, 1931. Serial No. 558,167.

This invention relates particularly to the series electric motors used on tramway vehicles, but is applicable to other motors subject to like variations of load.

The object of the invention is to provide improved means for controlling or regulating such motors, whereby, in the case of tramway vehicles, more rapid acceleration can be obtained automatically over a large range of speed variation.

The invention comprises the combination with the motor, of a separate generator which is connected to the motor field winding and serves as an automatic diverter through which current can pass in parallel with the field winding of the motor, and means for regulating the action of the diverter, the amount of current diverted from the motor field winding being dependent on the voltage produced by the generator.

The accompanying diagram illustrates one mode of applying the invention to a tramway vehicle series motor.

Referring to the diagram, the armature $a$ of a small generator driven by a suitable auxiliary motor comprising an armature $b$ and field winding $j$, is connected to the ends of the series field winding $c$ of the motor to be controlled or regulated. This generator $a$ is provided with a pair of field windings $d$, $e$, one of which ($d$) is in series with the main motor field winding $c$, whilst the other ($e$) which is an opposing winding is arranged in parallel with the armature $a$ or may be supplied from any other convenient source. Also in series with the motor field winding $c$ is arranged a coil $f$ forming the magnet winding of a vibratory relay $g$ which controls the current through the opposing winding $e$ in the generator. The armature of the motor to be regulated is indicated by $h$.

The arrangement is such that the generator armature $a$ can act as a diverter which provides an alternative path for the motor armature current in parallel with the motor field winding. When the motor is running slowly the current through the field winding $c$ and consequently through the relay winding $f$ is sufficient to hold the relay contacts apart, and this condition persists until with increase of speed of the motor the current falls to some predetermined value. At this point the magnet of the relay has become sufficiently weakened to allow the movable contact of the interrupter $g$, under the action of a spring $i$, to close on to the fixed contact and so close the circuit through the opposing winding $e$ of the generator. Previously the generator depended for its action on the field provided by the series current of the motor, and the potential difference impressed by the generator on the motor field winding was sufficient to prevent diversion of the motor current through the armature of the generator, or at least to prevent any considerable amount of current from being diverted. But with the closing of the relay contacts the opposing field winding is brought into action, and the electro-motive force produced by the generator falls, thereby allowing current to flow through the generator from the motor, and causing the current flowing through the motor armature to increase. The action of the relay is to keep the armature current as nearly constant as possible, and by suitably designing the apparatus the armature current can be kept substantially constant over a large range of speed variation in the motor.

It will be understood that the system above described is provided with the usual hand operated regulator whereby the current supplied to the motor from, for example, the overhead line $k$ through the trolley wheel $l$, can be controlled by the driver. This regulator consists of the usual resistance $m$ in series with the motor and the movable contact arm $n$, whereby the amount of resistance in action can be varied. After all the resistance has been cut out, the further regulation of the motor is effected automatically as above described.

It is desirable, however, to provide the driver with means whereby the automatic diverter is also to some extent under his control, and so make it possible for him to vary the acceleration of the motor when all the resistance has been cut out and the vehicle is, for example, travelling uphill. For this purpose, there is provided in parallel with the regulator coil *f* a variable resistance *o* which can be put into and out of action by the movable contact arm *n*. On reference to the diagram it will be seen that after all the resistance *m* has been cut out, further movement of the arm brings the resistance *o* into action so that the motor current is divided between the resistance *o* and the coil *f*. In consequence the action of the coil *f* is weakened, and the regulator is allowed to operate with a higher motor current than formerly. This effect can be varied by suitably moving the arm *n* and so varying the amount of resistance *o* in action.

By this invention it is possible to obtain more rapid accelerations of the vehicle, than is ordinarily obtainable, over a wide range of speed variation.

The invention is not limited to the example above described and subordinate details can be varied to suit different requirements. Also it will be understood that the circuits employed may be fitted with any appropriate protective devices such as circuit breakers or automatic switches.

Having thus described my invention what I claim as new and desire to secure by Letters Patent is:—

1. In means for controlling series electric motors, the combination with the motor, of an alternative path for current in parallel with the motor field winding, a generator connected to said winding and arranged to enable current to be automatically diverted from said winding through said path when the current passing to the motor falls to a predetermined value, and current responsive means for regulating the action of the generator, the amount of current diverted from the field winding being dependent upon the voltage produced by the generator, substantially as described.

2. In means for controlling series electric motors, the combination with the motor, of a separate generator which is connected in parallel with the field winding of the motor, a pair of opposed generator field windings one of which is in series with the motor field winding, means for supplying the other generator winding with current, a regulator of the vibratory type controlling the second mentioned field winding of the generator and having its operating winding in series with the motor, and a variable resistance in parallel with the said operating winding of the regulator, substantially as described.

3. In means for controlling series electric motors, the combination with the motor, of a separate generator which is connected in parallel with the field winding of the motor, a motor for driving the said generator, a pair of opposed field windings for the generator, one of which windings is in series with the motor field winding, means for supplying the other generator winding with current, a regulator of the vibratory type comprising an operating winding and fixed and movable contacts, for controlling the second mentioned field winding of the generator, the operating winding being in series with the motor, and the contacts in series with the second mentioned winding of the generator, a variable resistance in series with the motor, a variable resistance in parallel with the operating winding of the regulator, and hand actuated means for bringing the second mentioned resistance into action after the first mentioned resistance has been cut out, substantially as described.

In testimony whereof I have signed my name to this specification.

JOHN GOAD SMITHSON.